United States Patent [19]
Kuzay et al.

[11] Patent Number: 5,387,795
[45] Date of Patent: Feb. 7, 1995

[54] PHOTON BEAM POSITION MONITOR

[75] Inventors: Tuncer M. Kuzay, Naperville; Deming Shu, Darien, both of Ill.

[73] Assignee: The University of Chicago, Chicago, Ill.

[21] Appl. No.: 97,276

[22] Filed: Jul. 26, 1993

[51] Int. Cl.$^6$ ............................................. G01T 1/29
[52] U.S. Cl. ................... 250/336.1; 324/71.3
[58] Field of Search .................. 250/526, 336.1; 324/71.3; 378/145

[56] References Cited

U.S. PATENT DOCUMENTS 3,612,858 10/1971 De Parry ..................... 250/336.1
5,160,917 11/1992 Wechsler et al. ............... 340/686

OTHER PUBLICATIONS

R. Anne, G. Milleret, A. Lefol, R. Perret, "Secondary Emission Detector System for Saturne II." *IEEE Transactions on Nuclear Science*, vol. NS-24, No. 3 (Jun. 1977) pp. 1754-1755.

*Primary Examiner*—Constantine Hannaher
*Attorney, Agent, or Firm*—Emrich & Dithmar

[57] ABSTRACT

A photon beam position monitor for use in the front end of a beamline of a high heat flux and high energy photon source such as a synchrotron radiation storage ring detects and measures the position and, when a pair of such monitors are used in tandem, the slope of a photon beam emanating from an insertion device such as a wiggler or an undulator inserted in the straight sections of the ring. The photon beam position monitor includes a plurality of spaced blades for precisely locating the photon beam, with each blade comprised of chemical vapor deposition (CVD) diamond with an outer metal coating of a photon sensitive metal such as tungsten, molybdenum, etc., which combination emits electrons when a high energy photon beam is incident upon the blade. Two such monitors are contemplated for use in the front end of the beamline, with the two monitors having vertically and horizontally offset detector blades to avoid blade "shadowing". Provision is made for aligning the detector blades with the photon beam and limiting detector blade temperature during operation.

19 Claims, 7 Drawing Sheets

PHOTON BEAM POSITION MONITOR

CONTRACTUAL ORIGIN OF THE INVENTION

The U.S. government has rights in this invention pursuant to Contract No. W-31-109-ENG-38 between the U.S. Department of Energy and the University of Chicago representing Argonne National Laboratory.

FIELD OF THE INVENTION

This invention relates generally to apparatus for detecting and locating the position of a high heat flux and high energy photon beam and is particularly directed to a photon beam position monitor employing a plurality of metal coated, diamond blades for use with a high energy photon beam source.

BACKGROUND OF THE INVENTION

High energy synchrotron radiation sources are used for research in materials science, chemistry, physics, medical and biological imaging, geophysics and other fields. Currently under construction is the seven (7) GeV Advanced Photon Source (APS) that will generate high brilliance and intense synchrotron radiation from its insertion devices (IDs), which include a variety of magnetic wigglers and undulators. Essential to the success of the APS is a photon beam position monitor (PBPM) that is sensitive enough to locate the position of an X-ray beam with accuracy better than a micron, while withstanding potential damage from the unprecedented heat that could be deposited by an inaccurately steered X-ray beam. The cross-section of a beam can be visualized as having a "core" and a surrounding "halo". The hard X-ray core can cause extremely high heat loads, while the soft X-ray photons in the cooler halo dislodge electrons in metal blades projecting from the PBPM toward the beam. Continuous feedback of the dislodged electron signal correlates with the beam's location.

PBPMs are photo-electron generating components. When a PBPM is placed in the vicinity of a photon beam in ultra high vacuum, photons impinging on the blades of the PBPM knock off electrons in the blade material producing photo-electric currents which are used for determining the position of the beam. There may be two, four or six sets of such blades in a given PBPM, with a minimum of two sets of blades required to sense the beam position per spatial direction (vertical or horizontal). Prior art blades are made out of molybdenum, tungsten, titanium or a titanium alloy TZM. The operating requirements for the blade material are: good photo-electron generation, high thermal conductance and heat resistance, high structural strength, low thermal expansion coefficient, and good X-ray resistance. PBPM blades are typically positioned in the outer 25% of the beam's power envelope so that they are not subject to excessive heat loads which may distort the blade. The blades are also positioned far enough from the beam so as not to be directly hit and damaged by a missteered beam. The blades must remain parallel to the beam so that hot spots and thermal stress do not distort the blades and the blade material must remain rigid at highly elevated temperatures. In addition, thermal effects cause signal drift in these precision devices, with the thermal effects increasing with closer positioning of the PBPM to the beam. Prior art metallic photon detector blades have suffered from a variety of performance limitations in this hostile environment.

The aforementioned problems encountered in the prior art are addressed and resolved by a photon beam position monitor employing a plurality of spaced diamond detector blades each having an outer metal layer which are capable of operating in intense radiation fields in excess of 1250 W/mm$^2$ while providing submicron accuracy in determining photon beam position.

OBJECTS AND SUMMARY OF THE INVENTION

Accordingly, it is an object of the present invention to precisely determine the position of a high heat flux and high energy photon beam.

It is another object of the present invention to provide a photon beam detector such as for use in a high energy synchrotron which provides high strength and rigidity at high temperatures, a high degree of thermal conductivity, electrical insulation and radiation hardness, and low thermal expansion at high temperatures.

Yet another object of the present invention is to provide a photon beam position monitoring apparatus which allows for adjustable detector blade repositioning for quantifying detector sensitivity over a range of spacing from the beam.

The present invention contemplates a photon beam position monitor (PBPM) disposed in the front end of a beamline of a synchrotron storage ring which generates high energy radiation for measuring the position and, when used in tandem, slope of an X-ray beam emanating from a magnetic insertion device (ID) disposed in the straight sections of the storage ring. Typically, two such PBPM devices are positioned in a spaced manner in the front end of the beamline so that each device measures the vertical and horizontal position of the photon beam and the two devices, in combination, provide an indication of the vertical and horizontal divergence, or slope, of the beam. The PBPMs provide feedback information to storage ring magnets for particle beam position correction. Precision detection and the physical spacing of the PBPMs on the beamline's front end determine the requisite correction possible in the positional and trajectory deviation of the particle beam from its nominal orbit.

The inventive PBPM includes a plurality of spaced blades each comprised of chemical vapor deposition (CVD) diamond coated with a photon sensitive metal such as tungsten, molybdenum, etc. on the order of 1–5 microns thick. The PBPM blade material is structurally strong in thin foil form where the typical blade is approximately 20 mm wide × 70 mm long × 0.15 mm thick, thermally very conductive, a good photon-electron emitter and X-ray radiation hard. Even the man-made CVD diamond is several times (on the order of 3–4) higher in thermal conductivity than the most conductive utility metal, copper, which is used routinely to make the PBPM block to mount the blades. Diamond is also many times (on the order of 10–16) more conductive than the prior art blade materials such as titanium, tungsten, molybdenum and TZM. This permits the very high thermal energies incident on the diamond blade from the X-ray beam to be readily conducted away. Because prior art detector blades are comprised entirely of electrically conductive materials, they must be electrically isolated from the copper PBPM body which also should be in thermal contact with a cooling sink for the blades. Electrical isolation is typically provided by beryllium oxide (BeO) or aluminum oxide (Al$_2$O$_3$) wafers which are thermally conductive. Diamond is, likewise, thermally conductive, but electrically inert. Therefore, the diamond blade coated with an electrically conductive metal over its photo-electron generation portions only may be directly mounted to the copper heat sink without an intermediary material such as BeO or Al$_2$O$_3$ to conduct the heat directly into the sink.

These objects of the present invention are achieved and the disadvantages of the prior art are eliminated by an apparatus for monitoring the position of a high energy photon beam comprising: a plurality of detectors disposed about and responsive to the photon beam, wherein each of the detectors provides a respective output signal when the photon beam is incident upon the detectors and wherein each of the detectors is comprised of an inner diamond core and an outer photon sensitive metal layer disposed over the inner diamond core; and signal processing means coupled to the detectors and responsive to an output signal from each of the detectors for providing an indication of the position of the beam.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figures 1, 1A:
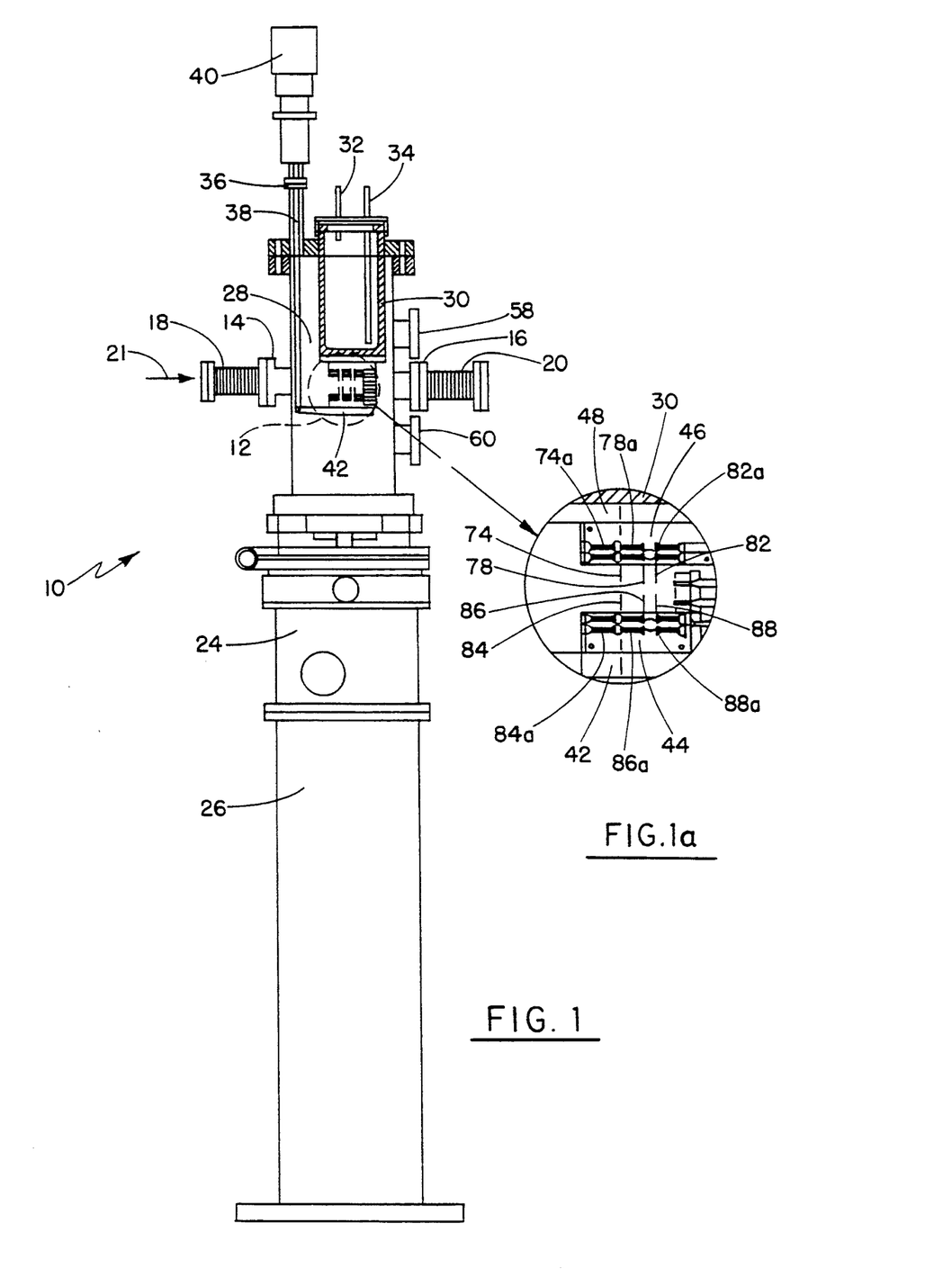
FIG. 1 is a simplified side elevation view shown partially in section of a photon beam position monitor in accordance with the present invention.
FIG. 1a is an enlarged view of the beam monitor assembly portion of the photon beam position monitor shown in FIG. 1.

Referring to FIG. 1, there is shown a partially sectioned side elevation view of a photon beam position monitor 10 in accordance with the present invention. The photon beam position monitor 10 includes a beam monitor assembly 12 shown in the enlarged view of FIG. 1a. The beam monitor assembly 12 is disposed within a vacuum vessel 28 through which a high energy photon beam is directed in the direction of arrow 21 in the figure. Vacuum vessel 28 includes a beam inlet port 14 and a beam outlet port 16 on opposing lateral surfaces thereof. A welded inlet bellows 18 is attached to the beam inlet port 14 for introducing a photon beam into the vacuum vessel 28. A welded outlet bellows 20 is connected to the beam outlet port 16 for allowing the photon beam to exit vacuum vessel 28 after transitting the beam monitor assembly 12. Vacuum vessel 28 is coupled to and evacuated by a vacuum source (not shown in the figure for simplicity) via a vacuum port 58. Vacuum vessel 28 further includes a viewing port 60 for allowing visual observation of the beam monitor assembly 12 within the vacuum vessel during operation. Vacuum vessel 28 is disposed on and supported by a stepping motor control stage 24 for permitting horizontal (X-direction) and vertical (Z-direction) displacement of the beam monitor assembly 12. The combination of the vacuum vessel 28 and stepping motor control stage 24 is disposed upon and supported by a base 26.

Disposed in vacuum vessel 28 is a coolant tank 30. Coolant tank 30 includes a water inlet 34 and a water outlet 32 for circulating a coolant such as water through the tank for limiting the temperature of the beam monitor assembly during operation. Disposed on the lower surface of water tank 30 is an electrical insulator 48 in the form of a round shim. Extending through an upper wall of vacuum vessel 28 is a mechanical feedthrough 36. Disposed within mechanical feedthrough 36 is a push rod 38 coupled at a first end outside of the vacuum vessel 28 to a stepping motor 40 and coupled at a second end within the vacuum vessel to a control arm 42. Push rod 38 is in the form of an elongated, linear threaded member such as a screw which is rotationally displaced by means of stepping motor 40 for raising or lowering control arm 42 for changing the spacing between an upper set of detector blades and a lower set of detector blades described below.

Figures 2, 3A, 3B, 3C, 4:
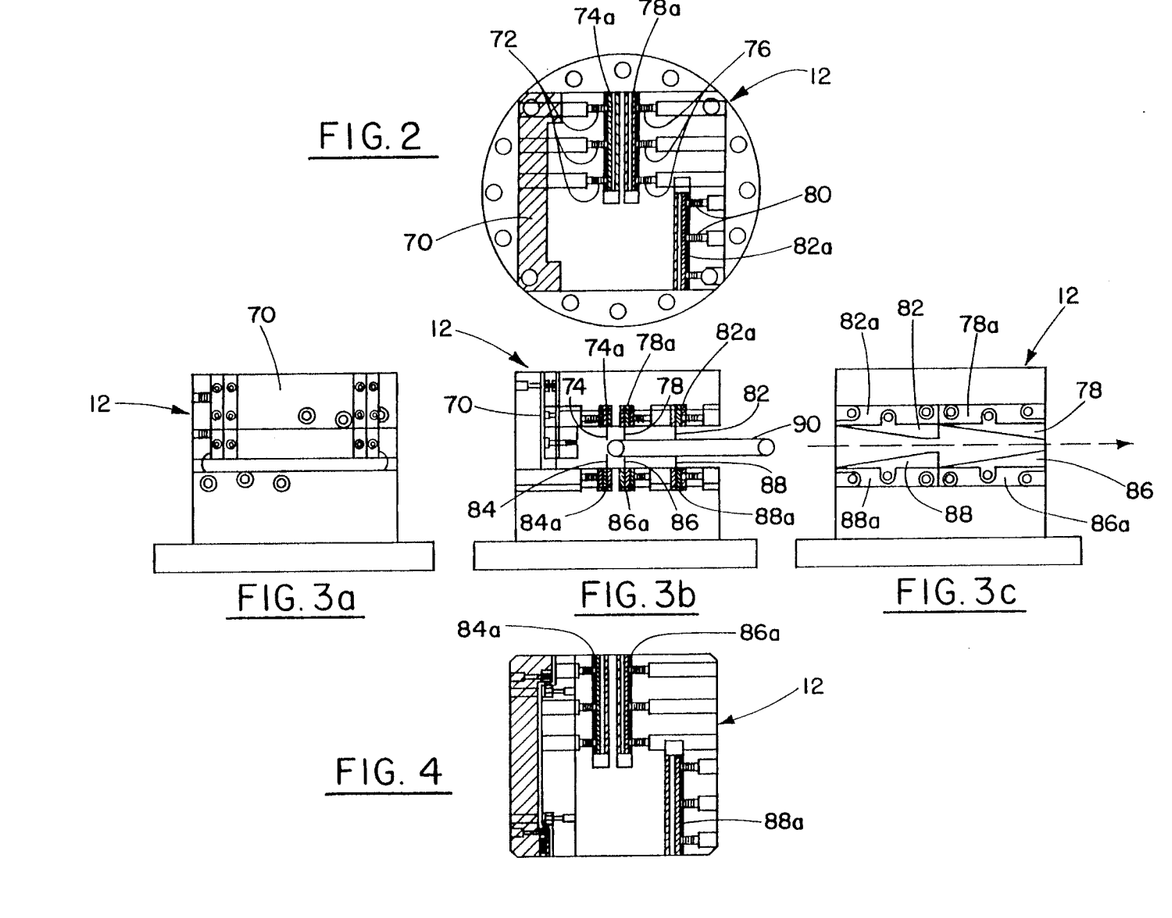
FIG. 2 is a top plan view shown partially in section of a beam monitor assembly for use in the photon beam position monitor of the present invention.
FIGS. 3a, 3b and 3c are respectively left side, front and right side elevation views of the beam monitor assembly of FIG. 2.
FIG. 4 is a bottom plan view of the beam monitor assembly of FIG. 2.
Figure 7:
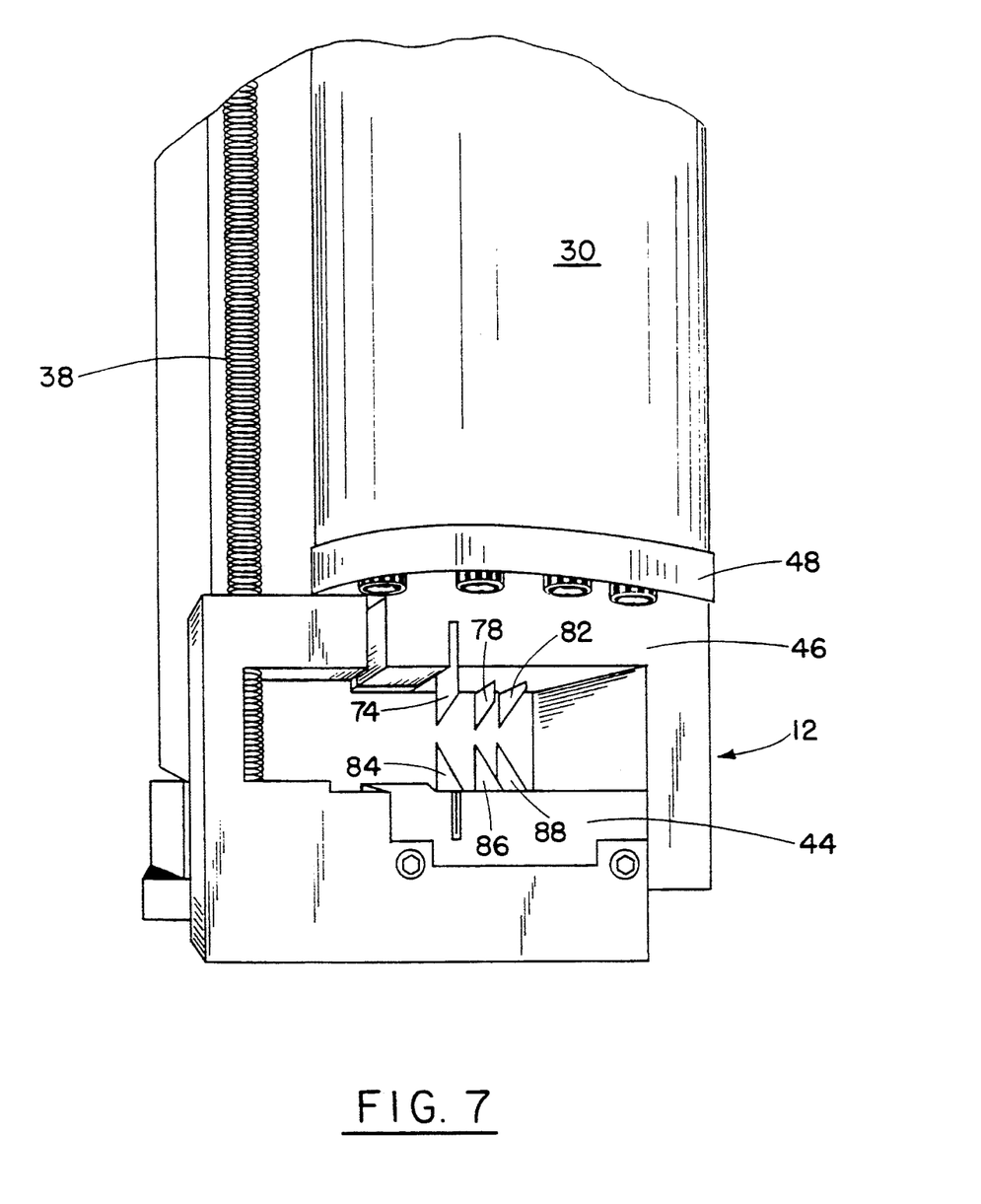
FIG. 7 is a partial perspective view of the photon beam position monitor of FIG. 1.

With reference to FIG. 1 as well as to FIGS. 2, 3a, 3b, 3c and 4, details of the beam monitor assembly 12 will now be described. FIGS. 2 and 4 are respectively top and bottom plan views of the beam monitor assembly 12, while FIGS. 3a, 3b and 3c are respectively left side, front and right side elevation views of the beam monitor assembly. A partial perspective view of the beam monitor assembly 12 is shown in FIG. 7. Beam monitor assembly 12 includes a lower jaw 44 and an upper jaw 46. Upper jaw 46 is mounted to the electrical insulator 48 on a lower portion of coolant tank 30. Lower jaw 44 is coupled to and supported by control arm 44. Attached to the upper jaw 46 are first, second and third upper blade holders 74a, 78a and 82a. Similarly, coupled to and supported by lower jaw 44 are first, second and third lower blade holders 84a, 86a and 88a. First, second and third upper blade holders 74a, 78a and 82a are respectively coupled to and provide support for first, second and third upper blades 74, 78 and 82. Similarly, the first, second and third lower blade holders 84a, 86a and 88a are respectively coupled to and provide support for first, second and third lower blades 84, 86 and 88. A photon beam is directed intermediate the three upper blades and the three lower blades which are adapted for precisely monitoring the position of the photon beam as it transits the beam monitor assembly 12 as described below. Vertical displacement of the control arm 42 by means of the stepping motor 40 and push rod 38 combination allows for precise vertical positioning of the three lower blades relative to the three upper blades for monitoring the position of the photon beam transitting therebetween. The first upper blade 74 is securely maintained in position within blade holder 74a by means of a plurality of spaced clamping screws 72. Similarly, the second and third upper blades 78 and 82 are securely maintained in position within their respective blade holders by respective sets of clamping screws 76 and 80. Similar blade mounting arrangements are provided for the lower set of detector blades.

In accordance with the present invention, each of the photon detector blades is comprised of man-made, chemical vapor deposition (CVD) diamond having an outer coating comprised of a thin layer of a photon sensitive metal. The blades are on the order of 20 mm wide and 70 mm long and are approximately 0.15 mm in thickness in one embodiment. The outer metal layer is on the order of 1–5 microns thick. Of the six blades shown in the figures, the closely spaced first and second upper blades 74 and 78 are used in combination with the closely spaced first and second lower blades 84 and 86 to measure the vertical and horizontal position of an undulator beam 90 as shown in FIG. 3b.

Figure 5A:
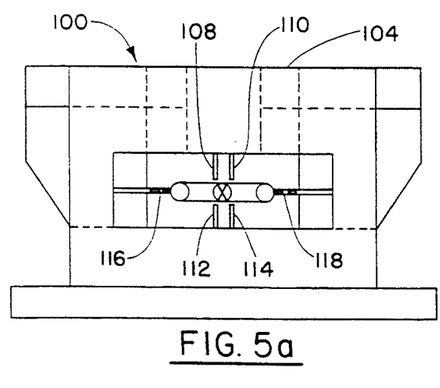
FIGS. 5a and 5b are front elevation views of first and second photon beam position monitors respectively positioned upstream and downstream along a beamline.
Figure 5B:
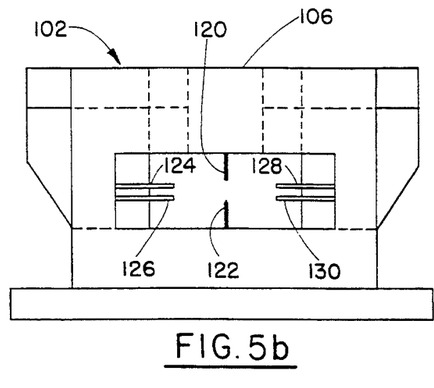
Figure 5C:
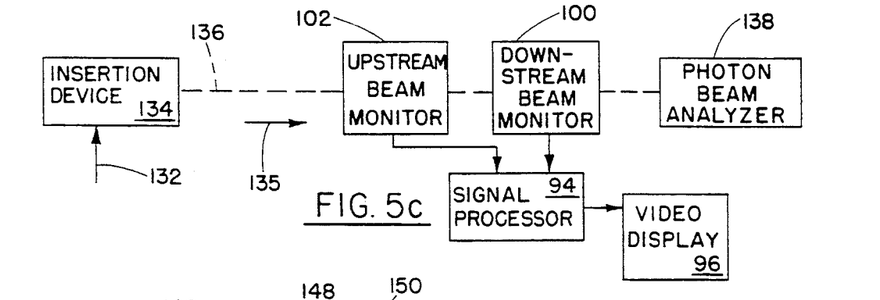
FIG. 5c is a simplified block diagram showing the position of the upstream and downstream beam monitors of FIGS. 5a and 5b in the photon beamline.

Referring to FIGS. 5a and 5b, there are respectively shown elevation views of an upstream beam monitor 100 and a downstream beam monitor 102 for use in monitoring the position of a high energy photon beam. Referring to FIG. 5c, there is shown a simplified schematic diagram of the manner in which the upstream and downstream beam monitors 100, 102 are employed in monitoring the position of a photon beam 136. As shown in FIG. 5c, a beam 132 of high energy particles such as generated in a synchrotron interacts with a magnetic field generated by an insertion device 134 positioned in the path of the beam of particles. Insertion device 134 exerts a changing magnetic field on the beam of particles 132 resulting in acceleration of the particles and the emission of high energy radiation such as in the form of an X-ray beam 136. The beam of particles 132 continues through the insertion device 134 on its path through the ring. The high energy photon beam 136 travels in the direction of arrow 135 through the upstream beam monitor 100 and thence through the downstream beam monitor 102 to a photon beam analyzer 138.

As shown in FIG. 5a, upstream beam monitor 100 includes a pair of upper beam detector blades 108 and 110, and a pair of lower beam detector blades 112 and 114. Upstream beam monitor 100 further includes first and second lateral beam detector blades 116 and 118. The downstream beam monitor 102 includes upper and lower beam detector blades 120 and 122. Downstream beam monitor 102 further includes first and second pairs of lateral beam detector blades 124, 126 and 128, 130. Upper and lower blades 120 and 122 in the downstream beam monitor 102 are laterally offset along the beamline from the upper pair of detector blades 108, 110 and the lower pair of detector blades 112, 114, respectively, in the upstream beam monitor 100. Similarly, the first pair of lateral beam detector blades 124, 126 in the downstream beam monitor 102 are respectively aligned along the beamline above and below the first lateral beam detector blade 116 in the upstream beam monitor 100 and lateral beam detector blades 128 and 130 in the downstream beam monitor are respectively aligned above and below the second lateral beam detector blade 118 in the upstream beam monitor along the beamline. By offsetting the upper, lower and lateral beam detector blades in the upstream and downstream beam monitors 100, 102, detector blade shadowing problems are avoided and beam position monitoring is performed more accurately.

As shown in FIG. 5c, the upstream and downstream beam monitors 100, 102 are coupled to a signal processor 94. In response to detection of the position of photon beam 136, the various detector blades within the upstream and downstream beam monitors 100, 102 provide output signals to the signal processor 94 which is coupled to a video display 96 for providing a visual indication of photon beam position. Video display 96 may provide either a graphic or digital read-out of photon beam position. Signal processor 94 may be conventional in design and operation with one example of such a signal processor shown in FIG. 8 and described in detail below.

Figure 6:
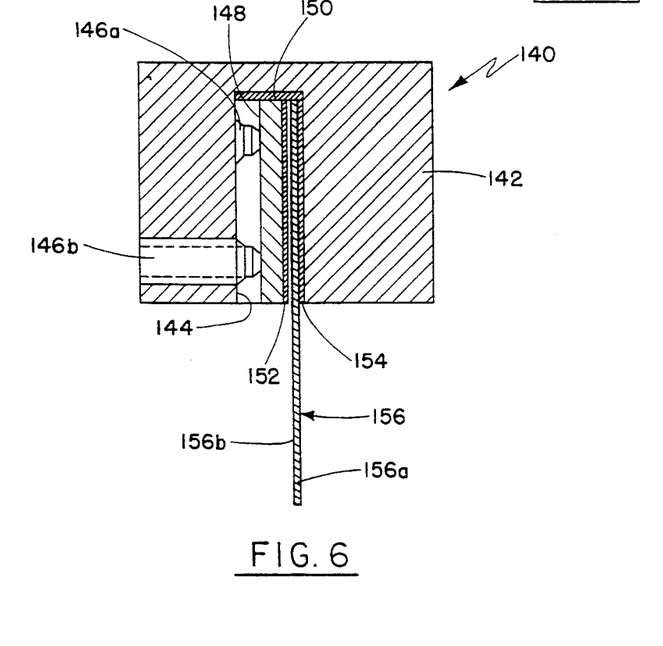
FIG. 6 is a simplified sectional view of a blade mounting assembly for positioning the CVD diamond beam detector blades in the photon beam position monitor of the present invention.

Referring to FIG. 6, there is shown a sectional view of a detector blade mounting assembly 140 for securely positioning a detector blade 156 in the beam monitor assembly 12. Blade mounting assembly 140 includes a beam monitor cooling base 142 having a slot 144 therein. Disposed in slot 144 is an OFHC plate 148 as well as first, second and third ceramic insulators 150, 152 and 154. First and second clamping screws 146a and 146b are disposed in respective slots within the beam monitor cooling base 142, with the ends of each of the clamping screws engaging plate 148. Tightening of the first and second clamping screws 146a, 146b results in rightward displacement of plate 148 for securely engaging detector blade 156 in a clamping manner. Detector blade 156 is engaged by the first, second and third ceramic insulators 150, 152 and 154 for electrically isolating the detector blade from the monitor base assembly 142 and the water-cooled base (not shown in the figure for simplicity). Each of the ceramic insulators preferably possesses good electrical insulation and thermal conduction properties. As shown in the sectional view of FIG. 6, detector blade 156 includes an inner diamond core 156a and an outer metal sheath or skin 156b.

Figure 8:
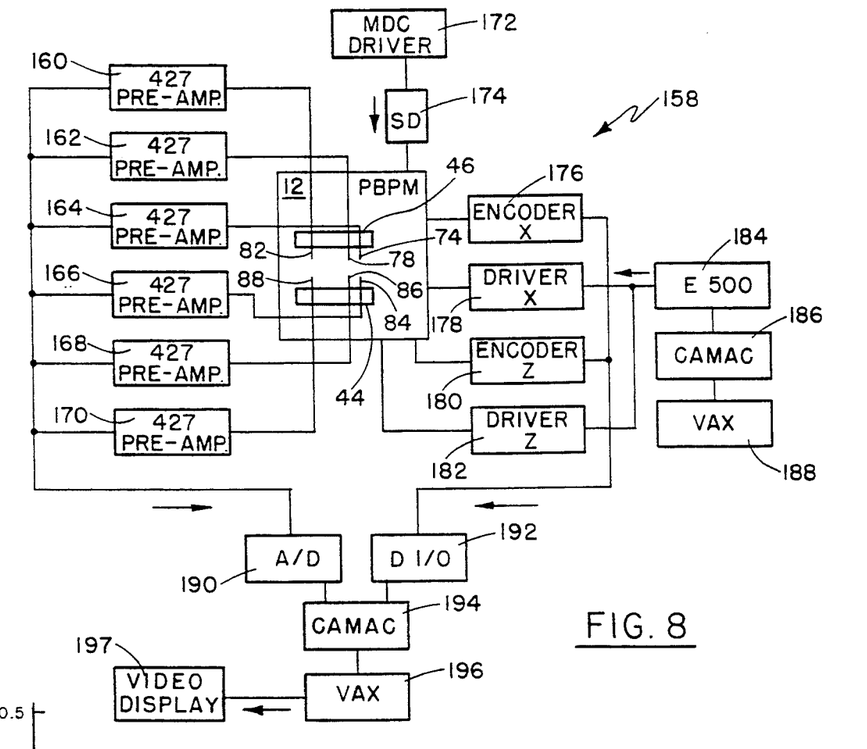
FIG. 8 is a simplified block diagram of the electronics employed for calibration of the photon beam position monitor of the present invention.

Referring to FIG. 8, there is shown a block diagram of a beam position monitor control and data acquisition system 158 for use with the beam monitor assembly 12 described above. As shown in the figure, photon beam position monitor (PBPM) 12 includes the aforementioned lower and upper jaws 44 and 46. Attached to the lower jaw 44 are the aforementioned first, second and third lower detector blades 84, 86 and 88. Attached to the upper jaw 46 are the aforementioned first, second and third upper detector blades 74, 78 and 82. The first, second and third upper detector blades 74, 78 and 82 are respectively coupled to pre-amplifiers 164, 162 and 160. Similarly, the first, second and third lower detector blades 84, 86 and 88 are respectively coupled to pre-amplifiers 166, 168 and 170. The output signals from the detector blades are microelectronicswise robust, but small, e.g., on the order of $10^{-6}$–$10^{-9}$ amps, which must be amplified to a suitable level by a pre-amplifier circuit. The outputs from the pre-amplifiers are provided to an analog-to-digital (A/D) circuit 190 which converts the analog signals representing detection of the photon beam by one or more of the detector blades to digital form. The digital output from the A/D circuit 190 is provided to a computer interface circuit (CAMAC) 194, and thence to a computer (VAX) 196. Also coupled to computer 196 via a digital input/output (I/O) circuit 192 and the computer interface circuit 194 are an X encoder 176 and a Z encoder 180. The X and Z encoders 176, 180 are coupled to the beam monitor assembly 12 and respectively provide horizontal and vertical beam monitor assembly positioning information. By receiving signals representing photon beam intensity via analog/digital circuit 190 and receiving beam monitor assembly horizontal and vertical position information via digital input/output circuit 192, computer 196 can provide accurate photon beam positioning information such as on a video display 197. The X and Z encoders 176, 180 receive the horizontal and vertical positioning information from the stepping motor control stage 24 shown in FIG. 1.

Also coupled to the beam monitor assembly 12 are an X driver 178 and a Z driver 182. The X and Z drivers 178, 182 cooperate with the stepping motor control stage 24 for respectively controlling the horizontal and vertical positions of the beam monitor assembly 12 relative to the photon beam. A computer 188 provides appropriate inputs via a computer interface circuit 186 and an E-500 circuit 184 to the X and Z drivers 178, 182 for providing gross alignment of the detector blades within the beam monitor assembly 12 with the photon beam. More precise alignment of the detector blades with respect to the photon beam is provided via the motor drive control (MDC) driver 172 via stepping motor 174 for rotationally displacing the push rod 138 shown in FIG. 7 and described above. The MDC driver 172 thus controls spacing between the upper and lower jaws and the gap between the upper and lower sets of detector blades attached to and supported by the jaws. The MDC driver circuit 172 thus provides fine alignment control of the detector blades with respect to the photon beam.

Figure 9:
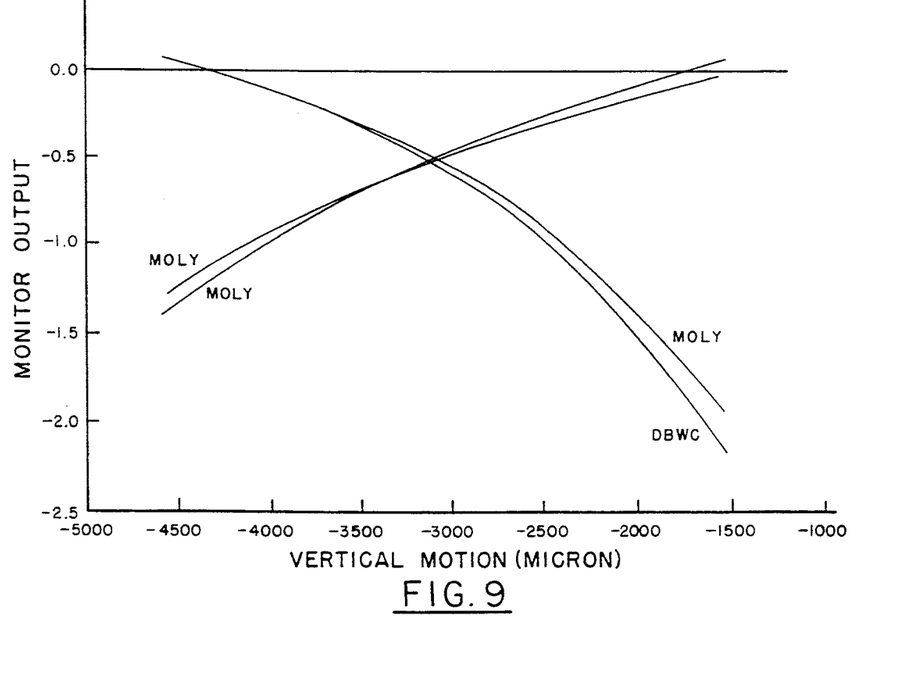
FIG. 9 is a graphic comparison of the photo-electron yield output for prior art molybdenum blades and diamond blades in accordance with the present invention as measured at the Cornell High Energy Synchrotron Radiation Source (CHESS)
Figure 10:
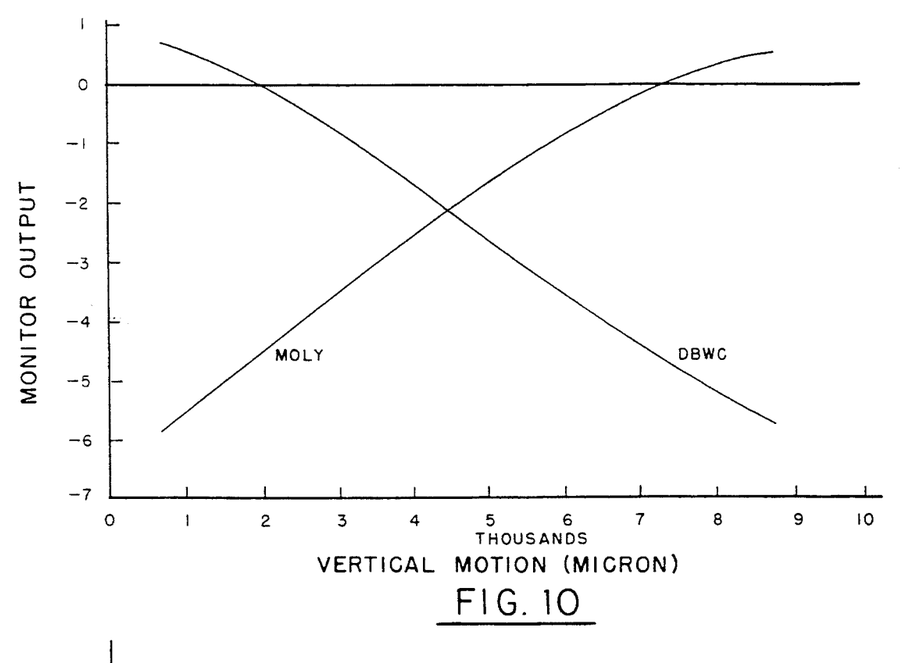
FIG. 10 is a graphic comparison of the photo-electron yield output for molybdenum blades with blades comprised of CVD diamond in accordance with the present invention as measured at the National Synchrotron Light Source (NSLS) at Brookhaven National Laboratory.
Figure 12:
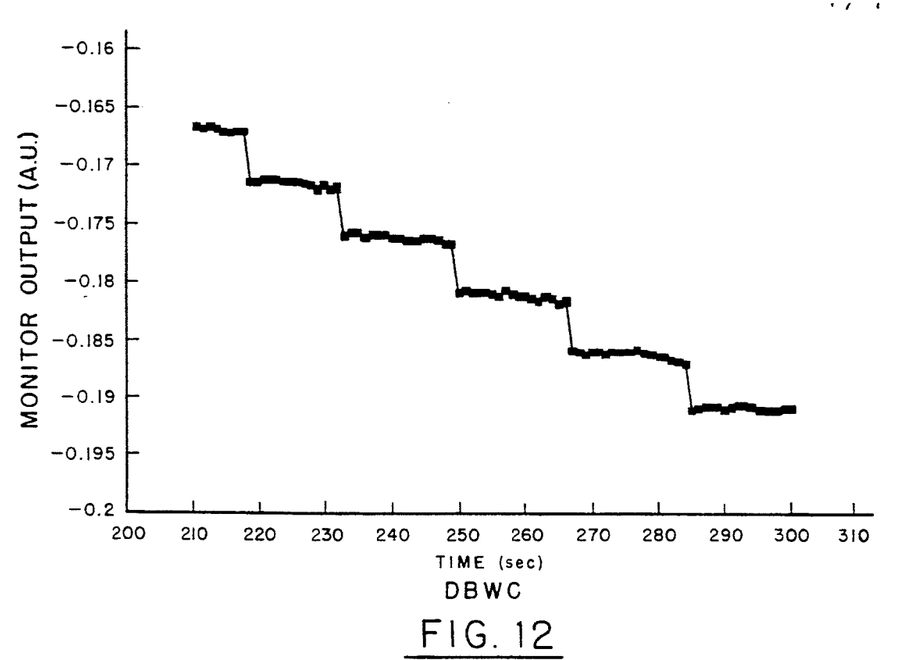
FIG. 12 shows graphically the change in the output sensitivity of the photon beam position monitor of the present invention with 5.0 micron jumps in monitor blade position as measured at NSLS.

Referring to FIG. 9, there is shown a graphic comparison of the total photo-electron yield output (monitor output) for a CVD-diamond-based, tungsten-coated (DBWC) detector blade and a molybdenum detector blade as measured on the NSLS X-13 soft X-ray undulator beamline. The four curves shown in FIG. 9 illustrate that the DBWC detector blade has a photo-emission response in an X-ray undulator beam similar to that of a molybdenum blade. Referring to FIG. 10, there is shown a graphic comparison of the photo-emission response in the X-13B soft X-ray undulator beamline of the NSLS of a CVD-diamond blade coated with a three micron tungsten layer (DBWC) and a molybdenum blade. The molybdenum blade was mounted on the same monitor base block as the CVD-diamond blade and paired with the diamond blade for vertical motion. A comparison of the MOLY and DBWC curves in FIG. 10 shows that there is no noticeable difference between the diamond blade and a conventional molybdenum blade in their total photo-electron yield. A series of five micron test stage jumps clearly demonstrated that the DBWC detector blade provided sub-micron position resolution similar in performance to the matched molybdenum blade as shown in FIG. 12 where the stepwise changes for the DBWC blade are essentially coincident with the stepwise changes for molybdenum blade.

Figure 11:
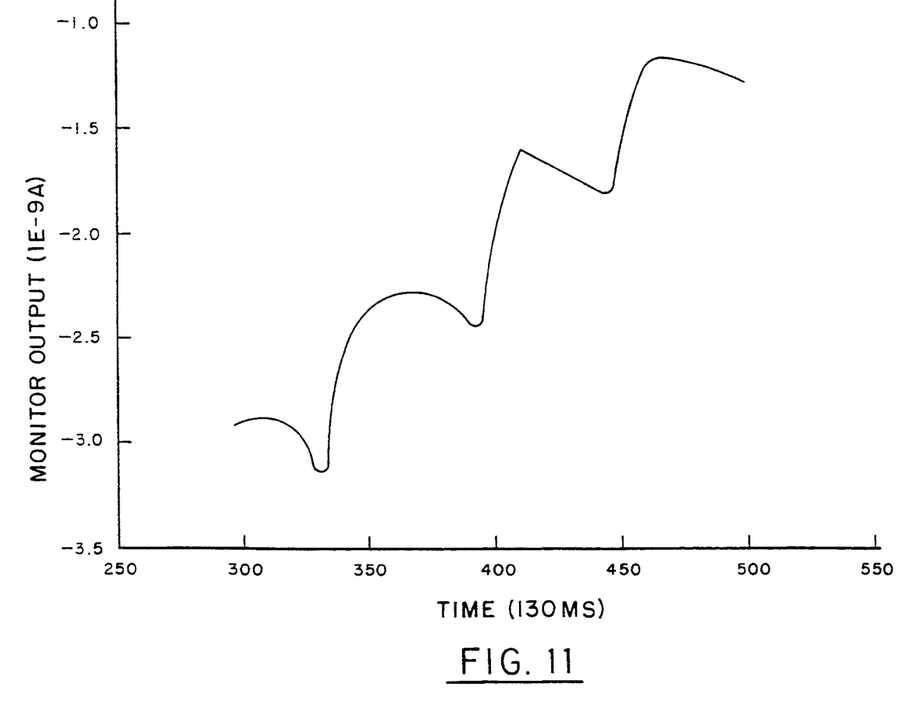
FIG. 11 shows graphically the output of the photon beam position monitor sensitivity of the present invention with five (5) micron jumps in monitor blade position as measured at CHESS.

Referring to FIG. 11, there is shown the photo-emission response for five micron jump tests for a diamond detector blade for a fixed blade gap of 6.7 mm as measured at the CHESS X-ray undulator beamline front end. As shown in FIG. 11, the photo-emission diamond based detector blades can be kept far enough away from the high power density photon beam while still providing good spatial resolution. On the CHESS undulator front end, when the detector blade gap was 6.75 mm (the rms size of the high power beam is only about 1 mm at the same location), the beam monitor still had about 2 mm linear dynamic response range and sub-micron sensitivity as shown in FIG. 11. Also as shown in FIG. 11, the photon beam position monitor output signal was found to be several times higher than the measuring electronics noise, with the signal observed after the five micron jumps representing the true sensitivity of the real beam motion.

Figure 13:
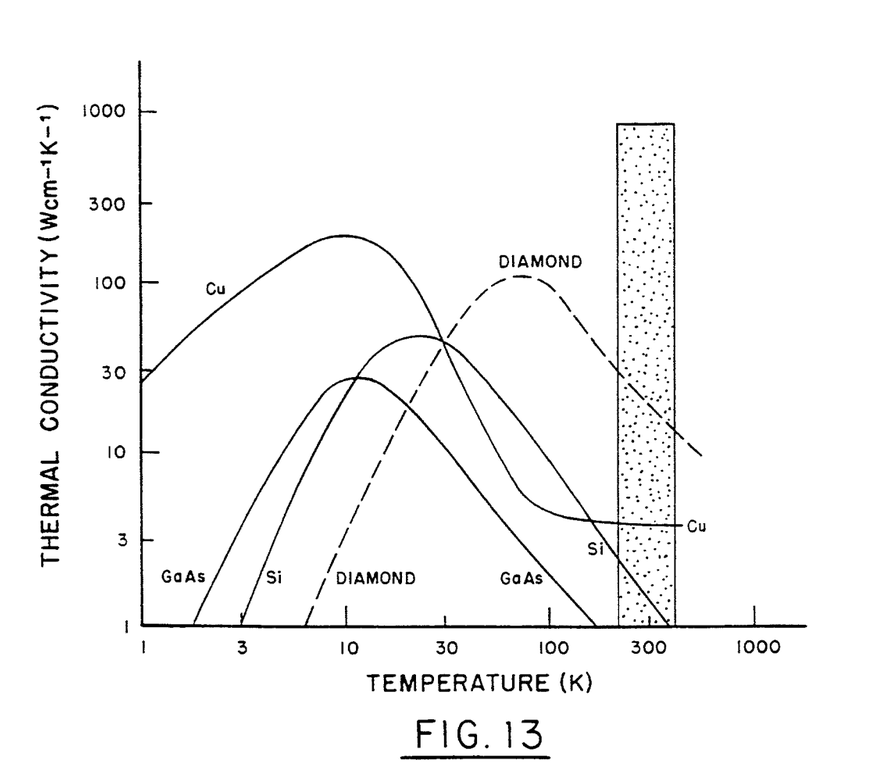
FIG. 13 shows graphically the variation of thermal conductivity with temperature for various photon detecting materials.

Referring to FIG. 13, there is shown a graphic comparison of the thermal conductivity of CVD diamond with various other materials such as copper, silicon and GaAs up to 1000° K. From FIG. 13, it can be seen that man-made CVD diamond is several times (on the order of 3-4 times) higher in thermal conductivity than the most conductive utility metal, copper. The CVD diamond is many times (on the order of 10-16) more conductive than the commonly utilized detector blade materials such as Ti, W, Mo and TZM. Therefore, the very high thermal energies imposed on the diamond detector blade by the high energy X-ray beam can be readily conducted away.

There has thus been shown a photon beam position monitor comprised of a plurality of spaced diamond blades each having an outer covering of photon sensitive metal for precisely detecting the position of an intense beam of radiation. Each blade includes a chemical vapor deposition (CVD) diamond core in and outer layer on the order of 1-5 microns thick of a metal such as molybdenum, tungsten, titanium or a titanium alloy. The photon beam position monitor is particularly adapted for use with a source of high energy X-rays such as a magnetic insertion device in a high energy synchrotron. The detector blades are intended to intercept an outer halo of the X-ray beam, but will not be damaged and will continue to operate even if the higher energy center portion of a missteered beam is intercepted.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. Apparatus for monitoring the position of a high heat flux and high energy photon beam comprising:
    a first plurality of detectors disposed about and responsive to the photon beam, wherein each of said detectors provides a respective output signal when the photon beam is incident upon said each of said detectors and wherein each of said detectors is comprised of an inner diamond core and an outer photon sensitive metal layer disposed over said inner diamond core; and
    signal processing means coupled to said detectors and responsive to an output signal from each of said detectors for providing an indication of the position of the beam.

2. The apparatus of claim 1 wherein said inner core of each of said detectors is comprised of chemical vapor deposition (CVD) diamond or a similar man-made diamond.

3. The apparatus of claim 2 wherein said outer metal layer of each of said detectors is comprised of a photoemission material such as molybdenum, tungsten, titanium or a titanium alloy.

4. The apparatus of claim 1 wherein each of said detectors has a generally flat, blade-like shape.

5. The apparatus of claim 4 wherein said generally flat, blade-like detector is on the order of 70 mm long, 20 mm wide and 0.15 mm thick.

6. The apparatus of claim 5 wherein said outer metal layer is 1–5 microns thick.

7. The apparatus of claim 1 wherein said first plurality of detectors includes an upper set of detectors disposed above the photon beam and a lower set of detectors disposed below the photon beam.

8. The apparatus of claim 7 further comprising variable positioning means coupled to at least one of said sets of detectors for varying the spacing between said upper and lower sets of detectors.

9. The apparatus of claim 1 further comprising coolant means coupled to said detectors for removing heat therefrom during operation.

10. The apparatus of claim 9 wherein said coolant means includes a circulating coolant tank.

11. The apparatus of claim 1 further comprising a second plurality of detectors disposed about and responsive to the photon beam, wherein each of said second plurality of detectors provides a respective output signal when the photon beam is incident upon said each of said detectors and wherein each of said second plurality of detectors is coupled to said signal processing means and is comprised of an inner diamond core and an outer photon sensitive metal layer disposed over said inner diamond core, and wherein said second plurality of detectors are positioned along the photon beam in a spaced manner from said first plurality of detectors, and wherein said second plurality of detectors are offset from said first plurality of detectors in a direction generally transverse to the direction of the photon beam to avoid detector shadowing.

12. A photon beam position monitor comprising:
    an evacuated housing having an inlet port and an outlet port for allowing the photon beam to pass through said housing;
    a plurality of detector blades disposed in said evacuated housing and about the photon beam, wherein each of said blades is responsive to the photon beam for providing a respective output signal when the photon beam is incident upon said each of said detector blades, and wherein each of said detector blades is comprised of an inner diamond core and an outer photon sensitive metal layer; and
    coolant means disposed in said evacuated housing and coupled to said detector blades for removing heat from said detector blades when the photon beam is incident thereon.

13. The photon beam position monitor of claim 12 wherein said plurality of blades includes a set of upper blades disposed above the photon beam and a set of lower blades disposed below the photon beam.

14. The photon beam position monitor of claim 13 further comprising spacer means coupled to said set of upper blades or to said set of lower blades for changing the spacing between said upper and lower sets of blades.

15. The photon beam position monitor of claim 14 wherein said spacer means includes a movable support member coupled to said set of lower blades and drive means coupled to said movable support member for raising and lowering said set of lower blades.

16. The photon beam position monitor of claim 12 wherein said outer photon sensitive metal layer is comprised of molybdenum, tungsten, titanium or a titanium alloy and wherein said diamond core is comprised of chemical vapor deposition (CVD) diamond.

17. The photon beam position monitor of claim 12 wherein said outer photon sensitive metal layer is on the order of 1–5 microns thick.

18. The photon beam position monitor of claim 12 further comprising positioning means for moving said plurality of detector blades relative to the photon beam.

19. The photon beam position monitor of claim 12 further comprising first and second pluralities of detector blades respectively disposed upstream and downstream along the photon beam.

* * * * *